United States Patent [19]

Ueno et al.

[11] 4,429,024

[45] Jan. 31, 1984

[54] METHOD OF MAKING ANTISTATIC MAGNETIC RECORDING TAPES AND RECORDING TAPES

[75] Inventors: Susumu Ueno; Hirokazu Nomura, both of Ibaraki; Kiyoshi Imada, Omiya, all of Japan

[73] Assignee: Shin-Etsu Chemical Co., Ltd., Tokyo, Japan

[21] Appl. No.: 406,058

[22] Filed: Aug. 6, 1982

[30] Foreign Application Priority Data

Aug. 14, 1981 [JP] Japan ................................. 56-127467

[51] Int. Cl.³ ............................................. B05D 3/06
[52] U.S. Cl. ...................................... 428/694; 427/41; 427/128; 427/131; 427/296; 428/900
[58] Field of Search ................. 427/41, 128, 131, 296; 428/694, 900

Primary Examiner—Bernard D. Pianalto
Attorney, Agent, or Firm—Toren, McGeady and Stanger

[57] ABSTRACT

The invention provides a novel means for solving and overcoming the problems in the magnetic recording tapes caused by the accumulation of static electricity during travelling of the tape affecting the quality of the reproduced sounds and picture images by playing the tape. The inventive method comprises providing at least one surface of the plastic-made film base with a layer of a plasma-polymerized gaseous compound of a specific type by exposing the surface of the film base to the atmosphere of low temperature plasma generated in the low pressure atmosphere of the gas or vapor of a compound such as an amine, organosilane, aliphatically unsaturated compound and aromatic compound, preferably, before coating the film base with a magnetic coating composition. The plasma-polymerized layer is effective to decrease the surface resistivity of the film base and to reduce the accumulation of static electricity induced by rubbing.

7 Claims, No Drawings

METHOD OF MAKING ANTISTATIC MAGNETIC RECORDING TAPES AND RECORDING TAPES

BACKGROUND OF THE INVENTION

The present invention relates to an improved magnetic recording tape or, in particular, to a magnetic recording tape free from the problems due to the accumulation of static electricity.

Needless to say, magnetic recording tapes are widely used in various fields of electronics technology including audio tapes, video tapes, computer tapes and the like. Since almost all of the magnetic recording tapes currently on use are formed with a film base of a synthetic plastic resin coated on one surface with a magnetic composition, they have problems due to the electrostatic charging. That is, among the plastic materials used for the film base of the magnetic recording tapes such as polyesters, polyvinyl chlorides, cellulose acetates and the like, polyester-based ones are generally preferred by virtue of the large mechanical strengths thereof over the other kinds of the plastic materials in accordance with the recent requirement for a thinner and thinner film base to reduce the volume of the tape roll. Polyester-based film base for the magnetic recording tapes, however, is very susceptible to the accumulation of static electricity thereon so that the magnetic recording tapes with the polyester film base are unavoidably defective due to the static electricity such as the variation of the travelling velocity in recording and playing, generation of noise when used in sound recording, disorder in the picture images when used in video recording, distortion of the roll form and the like.

Of course, there have been made various attempts to prevent such disadvantageous phenomena by improving the antistatic property of the magnetic recording tapes to be less susceptible to the electrostatic charging. One of the approaches is the incorporation of an electroconductive filler such as carbon black into the plastic film as the film base for the magnetic recording tape. The other approach is the use of an antistatic agent which is either incorporated into the plastic film by blending or used for coating the surface of the film base. The former method has problems in the decreased smoothness of the surface of the tape and lower mechanical strengths thereof since sufficient antistatic effect can be obtained only by the incorporation of a considerably large volume of the carbon black. The latter method of the use of an antistatic agent is also not free from problems in that the durability of the antistatic effect obtained therewith is relatively low and further the antistatic agent bleeding on the surface of the film base sometimes transfers to the magnetic layer when the magnetic recording tape is wound to make up a roll so that adverse effects are caused on the sounds and picture images when the tape is played.

Accordingly there has been an eager demand for developing a method in which improvements can be obtained in the antistatic performance of a magnetic recording tape without the above mentioned problems in the prior art.

SUMMARY OF THE INVENTION

It is therefore an object of the present invention to provide a novel and improved magnetic recording tape which is outstandingly insusceptible to the accumulation of electrostatic charge without the disadvantages in the conventional antistatic magnetic recording tapes.

Another object of the invention is to provide a novel and improved method for the preparation of an antistatic magnetic recording tape without the disadvantages in the prior art.

The antistatic magnetic recording tape of the invention comprises a film base of a synthetic plastic resin, a layer of a plasma-polymerized organic gas provided on at least one surface of the film base and a magnetic layer provided on at least one surface of the film base.

Such an antistatic magnetic recording tape is prepared, for example, by first exposing the surface of the film base to an atmosphere of a low temperature plasma generated in the gaseous phase of an amine compound, an organosilane compound or a radical-polymerizable unsaturated or aromatic organic compound to deposit a layer of the plasma-polymerized material on at least one surface of the film base and then providing the magnetic layer on at least one surface of the film base.

The magnetic recording tape prepared in this manner is remarkably insusceptible to the accumulation of static electricity and the antistatic effect is durable over a long period of time. it has been confirmed that the plasma-polymerized layer on the surface of the film base has no adverse effects on the quality of the magnetic recording tape and the sounds and picture images reproduced by playing the tape are as good as with the magnetic recording tape without such a plasma-polymerized layer.

DETAILED DESCRIPTION OF THE PREFERRED EMBODIMENTS

As is mentioned above, the inventive antistatic magnetic recording tape is characterized by the plasma-polymerized layer of an organic compound provided on the surface of the film base. It is optional that the plasma-polymerized layer is provided on one surface alone of the film base or on both surfaces. It is further optional that the formation of this plasma-polymerized layer is either succeeded or preceded by the coating procedure of the film surface with a magnetic coating composition.

The method for forming the plasma-polymerized layer of an organic compound by use of a low temperature plamsa is well known in the art. Briefly speaking, the tape before or after coating with the magnetic coating composition is introduced into a vacuum chamber equipped with electrodes and a low temperature plasma is generated in the chamber by applying a high-frequency voltage to the electrodes while the atmosphere inside the chamber is kept under a low pressure of 0.001 to 10 Torr or, preferably, 0.01 to 1 Torr with the gas or vapor of the specified compound.

The conditions for the generation of low temperature plasma in the plasma chamber is not particularly limitative but may be diversified widely. For example, the frequency of the electric power to be supplied to the electrodes is usually in the high frequency range from a few kHz to several hundreds of MHz but low frequency range or even direct current voltage is also suitable. The types of the electrodes include exterior electrodes, inside electrodes and coiled electrodes connected to the high frequency generator by capacitive coupling or inductive coupling. The mode of the electric discharge may be either electrode discharge or electrodeless discharge. The time for the plasma treatment should be determined depending on the electric power supply and other parameters but sufficient results can be obtained usually by the plasma treatment for a few seconds to several tens of minutes. At any rate, care must be taken to avoid thermal denaturation of the tape surface by the heat of electric discharge.

The kind of the gaseous compound to constitute the plasma atmosphere is of some importance in order to impart satisfactory antistatic performance to the magnetic recording tape of the invention. Suitable gasifiable compounds may be classified into three classes according to the characteristics in the chemical structure. They are organic amine compounds, organic silicon compounds and radical-polymerizable unsaturated or aromatic compounds.

The first class compounds, i.e. organic amine compounds, are typically represented by either one of the following structural formulas:

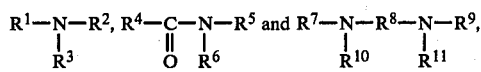

in which $R^1$ and $R^7$ each denote a substituted or unsubstituted monovalent hydrocarbon group, $R^2$, $R^3$, $R^4$, $R^5$, $R^6$, $R^9$, $R^{10}$ and $R^{11}$ each denote a hydrogen atom or a substituted or unsubstituted monovalent hydrocarbon group and $R^8$ denotes a substituted or unsubstituted divalent hydrocarbon group.

Particular examples of the organic amine compounds belonging to these classes are amines, amides and imides as well as derivatives thereof such as methyl amine, dimethyl amine, trimethyl amine, ethyl amine, diethyl amine, triethyl amine, n-propyl amine, di-n-propyl amine, tri-n-propyl amine, n-butyl amine, n-amyl amine, n-hexyl amine, lauryl amine, ethylene diamine, trimethylene diamine, hexamethylene diamine, ethanol amine, diethanol amine, allyl amine, aniline, alanine, N-methyl aniline, allyl dimethyl amine, 2-aminoethyl ether, 1-dimethylamino-2-chloroethane, cyclopropyl amine, cyclohexyl amine, ethylene imine, 1-methyl ethylene imine, N,N-dimethyl formamide, formamide, capronamide, aminoacetal, benzyl amine, piperidine, pyrrolidine, morpholine and the like. It is of course optional that these organic amine compounds are used either individually or as a combination of two kinds or more according to need.

The gasifiable compounds belonging to the second class are organic silicon compounds, typically, exemplified by various kinds of organosilane compounds and organopolysiloxane compounds as a hydrolysis-condensation product of the corresponding organosilane compound.

The orgasnosilane compounds are represented by the general formula $R_aH_bSiX_{4-a-b}$, in which R denotes a monovalent hydrocarbon group such as alkyl, alkenyl and aryl groups, X denotes a hydrolyzable atom or group such as halogen atoms and alkoxy groups and a and b are each zero or a positive integer not exceeding 4 or not exceeding 2, respectively, with the proviso that a+b is not exceeding 4. Particular examples of such organosilane compounds include trimethyl chlorosilane, trimethyl methoxy silane, vinyl dimethyl chlorosilane, methyl chloromethyl methoxy chlorosilane, methyl dichlorosilane, dimethyl dimethoxy silane, vinyl methyl dichlorosilane, vinyl trimethoxy silane, tetramethoxy silane and the like. The organopolysiloxane compounds may be readily obtained by the hydrolysis and silanolic condensation reaction of these organosilane compounds. It is of course optional that these organic silicon compounds are used either individually or as a combination of two kinds or more according to need.

The third class of the gasifiable compounds includes unsaturated compounds containing at least one ethylenic double bond or acetylenic triple bond in a molecule and aromatic compounds as well as derivatives thereof. Several of the particular examples of these compounds are: ethylenically or acetylenically unsaturated aliphatic compounds such as ethylene, propylene, 1-butene, 2-butene, acetylene, 2-methyl propene, vinyl chloride, vinylidene chloride, acrolein, allyl amine, allyl methyl amine, allyl dimethyl amine, allyl alcohol, maleic acid, acrylic acid, methyl methacrylate and the like; alicyclic unsaturated compounds such as cyclopentene, cyclohexene, cyclohexenol and the like; heterocyclic compounds such as 2,5-dihydrofuran and the like; aliphatic dienic and trienic compounds such as propadiene, 1,3-butadiene, 1,2-butadiene, 1,7-octadiene, 1,3,5-hexatriene, 2-vinyl-1,3-butadiene and the like; and aromatic compounds such as benzene, styrene, phthalic acid, phenol, aniline, methyl aniline, dichlorobenzene, benzaldehyde, naphthalane, vinyl naphthalene and the like as well as cyclohexadiene, pyridine, thiophene and the like. These compounds may also be used either individually or as a combination of two kinds or more according to need.

Any one of the above named gasifiable compounds may be used provided that the compound has a vapor pressure sufficient to give a pressure above mentioned inside the plasma chamber. Since the pressure necessary to support the low temperature plasma is relatively low, even a compound having a considerably large molecular weight can be used suitably.

If necessary, the gas or vapor of the above named gasifiable compound is used as diluted with the gas of a nitrogen-containing inorganic compound or other inorganic gases such as nitrogen monoxide, nitrogen dioxide, ammonia, air, oxygen, nitrogen, chlorine, water vapor, carbon monoxide, carbon dioxide, hydrogen chloride, argon, helium, neon and the like.

When subjected to the above described plasma treatment, the surface of the film base for the magnetic recording tape is provided with a plasma-polymerized layer of the compound which is effective for preventing electrostatic charging. It is preferable that this plasma-polymerized layer is further brought into contact with a halogen such as chlorine, fluorine, bromine and iodine or a halogen compound such as hydrogen halides, e.g. hydrogen chloride, hydrogen fluoride and hydrogen bromide, vinyl chloride, allyl chloride, methyl chloride, propyl fluoride, 1,1,2-trifluoroethane, 1,1-dichloroethane, chloroform, carbon tetrachloride and the like whereby the antistatic effect is further enhanced and permanency thereof is ensured.

Despite the very small thickness of the plasma-polymerized layer of the organic gas formed on the surface of the film base by the above described method, which is usually in the range from 0.01 to 1 μm, this plasma-polymerized layer exhibits a very strong antistatic performance so that the magnetic recording tape manufactured of such a film base can be freed from the problems in the conventional magnetic recording tapes due to the accumulation of static electricity. That is, the inventive magnetic recording tapes are not subject to the variation of the travelling velocity in the recording and playing thereof as well as the problems of noise generation in the sound reproduction and disorder of picture images in the video reproduction. Further-more, the plasma-polymerized layer is strongly adhesive to the surface of the film base so that the layer is very durable and never peels off during travelling of the magnetic recording tape and also is effective to prevent bleeding of the ingredients which may be contained in the plastic resin of the film base. Therefore the stability of the excellent quality of the inventive magnetic recording tape can be ensured over a long period of time in the sound and picture image reproduction.

The film base having been provided with the plasma-polymerized layer of the gasifiable compound on at least one surface is then coated with a magnetic coating composition to form the magnetic layer by the gravure process, doctor blade method, reverse roller method and the like followed by drying to give the inventive antistatic magnetic recording tape. Preferably, the plasma-polymerized layer is formed only on one surface of the film base and then the film base is coated on the other surface with the magnetic coating composition. It is optical, however, that the magnetic layer is first formed on one surface of the film base according to the conventilonal coating method and then the plasma-polymerized layer is formed on the other surface of the film base. The inventive magnetic recording tapes are of course not limited to the above described types and the object of the present invention to obtain the antistatic effect is equally achieved even when the film base is provided on both surfaces with the plasma-polymerized layers of the gasifiable compound and the magnetic layers.

Following is the example to illustrate the present invention in further detail.

EXAMPLE

A rolled polyester-made film base having a thickness of 50 μm was placed in the plasma chamber of a plasma-generating apparatus and, after evacuation of the chamber to a vacuum of 0.01 Torr, air and the vapor of trimethyl chlorosilane were successively introduced thereinto each to give a partial pressure of 0.04 Torr with a total pressure of 0.08 Torr. A low temperature plasma was generated in this gaseous atmosphere by supplying a high frequency electric power of 4 kilowatts at a frequency of 13.56 MHz to the electrodes while the rolled film base mounted on the tape-feeding unit inside the plasma chamber was drawn out and run between the electrodes at a velocity of 3 m/minute to be would up again into a roll after being exposed on one surface thereof to the plasma atmosphere.

The surface resistivity and the charge voltage induced by rubbing were measured with this film base before and after the above described plasma treatment to give the results shown in Table 1 below. The surface resistivity was determined in an atmosphere of 60% relative humidity at 25° C. and the charge voltage by rubbing was determined after 30 seconds, 1 minute and 10 minutes of rubbing with a cotton cloth under a load of 200 g rotating at a velocity of 750 r.p.m. and also after 15 minutes of attenuation following the 10 minutes rubbing.

In the next place, the thus plasma-treated polyester film base was coated on the surface not exposed to the plasma atmosphere with a coating composition prepared by blending a magnetic powder of —$Fe_2O_3$ with a binder followed by orientation treatment and drying to give a magnetic recording tape, of which the surface resistivity and the charge voltage induced by rubbing were measured in the same manner as above to give the results shown in Table 2 below.

TABLE 1

| | | Item | | | |
|---|---|---|---|---|---|
| | | Charge voltage by rubbing, volts | | | |
| Polyester film base | Surface resistivity, ohm | After 30 seconds rubbing | After 1 minute rubbing | After 10 minutes rubbing | After 5 minutes attenuation |
| Before plasma treatment | $5 \times 10^{14}$ | 1,200 | 2,100 | 8,000 | 7,000 |
| After plasma treatment | $1 \times 10^9$ | 100 | 200 | 500 | 0 |

Table 2 also includes the results obtained with a magnetic recording tape prepared with the polyester film base without the plasma treatment for comparative purpose.

The above prepared inventive and comparative magnetic recording tapes were subjected to the tests for the travelling performance and noise generation when used for the sound reproduction. While there were noted disordered travelling after about 200 times of repeated playing and gradual increase of noise as the number of playing was increased with the comparative tape, the inventive tape exhibited quite stable travelling performance and no increase was noted in the noise generation with this inventive tape regardless of the number of playing up to 500 times.

TABLE 2

| | | Item | | | |
|---|---|---|---|---|---|
| | | Charge voltage by rubbing, volts | | | |
| Magnetic recording tape with film base | Surface resistivity, ohm | After 30 seconds rubbing | After 1 minute Rubbing | After 5 minutes rubbing | After 5 minutes attenuation |
| Before plasma treatment | $2 \times 10^{14}$ | 1,000 | 1,800 | 7,800 | 6,500 |
| After plasma treatment | $2 \times 10^9$ | 150 | 300 | 700 | 0 |

What is claimed is:

1. An antistatic magnetic recording tape which comprises a film base made of a synthetic plastic resin, a layer of a plasma-polymerized gaseous compound provided on at least one surface of the film base and a magnetic layer provided on at least one surface of the film base.

2. The antistatic magnetic recording tape as claimed in claim 1 wherein the layer of the plasma-polymerized gaseous compound is provided on one of the surfaces of the film base and the magnetic layer is provided on the other surface of the film base.

3. The antistatic magnetic recording tape as claimed in claim 1 wherein the layer of the plasma-polymerized gaseous compound is provided on at least one surface of the film base and the magnetic layer is provided on the layer of the plasma-polymerized gaseous compound.

4. The antistatic magnetic recording tape as claimed in claim 1 wherein the magnetic layer is provided on at least one surface of the film base and the layer of the plasma-polymerized gaseous compound is provided on the magnetic layer.

5. A method for the preparation of an antistatic magnetic recording tape which comprises exposing at least one surface of a film base made of a synthetic plastic resin to an atmosphere of low temperature plasma generated in a low pressure atmosphere of a gas or vapor of a gasifiable compound in the range from 0.001 Torr to 10 Torr to deposit a layer of the plasma-polymerized gasifiable compound on the surface of the film base and coating at least one surface of the film base with a magnetic coating composition to form a magnetic layer thereon.

6. The method for the preparation of an antistatic magnetic recording tape as claimed in claim 5 wherein only one of the surface of the film base is exposed to the atmosphere of low temperature plasma and the magnetic layer is formed on the other surface of the film base not exposed to the atmosphere of the low temperature plasma.

7. The method for the preparation of an antistatic magnetic recording tape as claimed in claim 5 wherein the gasifiable compound is selectded from the class consisting of amine compounds, organic silicon compounds, aliphatically unsaturated organic compounds and aromatic compounds.

* * * * *